United States Patent
Fournier et al.

(10) Patent No.: US 8,627,922 B2
(45) Date of Patent: Jan. 14, 2014

(54) LAMINATED ACOUSTIC SOUNDPROOFING PANEL

(75) Inventors: David Fournier, Breteuil (FR); Marc Rehfeld, Ezanville (FR); Pascal Ozouf, Champs sur Marne (FR)

(73) Assignee: BPB Limited (GB)

( * ) Notice: Subject to any disclaimer, the term of this patent is extended or adjusted under 35 U.S.C. 154(b) by 0 days.

(21) Appl. No.: 13/255,172

(22) PCT Filed: Mar. 10, 2010

(86) PCT No.: PCT/GB2010/050425
§ 371 (c)(1),
(2), (4) Date: Dec. 15, 2011

(87) PCT Pub. No.: WO2010/103322
PCT Pub. Date: Sep. 16, 2010

(65) Prior Publication Data
US 2012/0073899 A1 Mar. 29, 2012

(30) Foreign Application Priority Data
Mar. 10, 2009 (GB) .................................. 0904099.9

(51) Int. Cl.
| | | |
|---|---|---|
| E04B 1/82 | (2006.01) | |
| E04B 1/84 | (2006.01) | |
| E04B 2/02 | (2006.01) | |
| E04B 9/00 | (2006.01) | |
| F16F 7/00 | (2006.01) | |
| F16F 15/00 | (2006.01) | |
| B32B 7/12 | (2006.01) | |

(52) U.S. Cl.
USPC ........... 181/294; 181/207; 181/208; 181/284; 181/290; 428/354

(58) Field of Classification Search
USPC .......................... 181/294, 290, 108, 207, 284
See application file for complete search history.

(56) References Cited

U.S. PATENT DOCUMENTS 4,663,224 A * 5/1987 Tabata et al. ................... 442/181
5,830,548 A * 11/1998 Andersen et al. ............. 428/36.4
(Continued)

FOREIGN PATENT DOCUMENTS

| DE | 102005059949 | 11/2006 |
|---|---|---|
| EP | 1688553 A1 | 2/2005 |

(Continued)

OTHER PUBLICATIONS

QuietGlue Pro, Datasheet and Material Safety Data Sheet; Serious Energy, Inc., 2012.

(Continued)

*Primary Examiner* — David Warren
*Assistant Examiner* — Christina Russell
(74) *Attorney, Agent, or Firm* — GrayRobinson, P.A.; Michael J. Colitz, III

(57) ABSTRACT

A laminated acoustic building panel comprises a pair of plasterboard substrates which are bonded together by an adhesive layer, the panel having a dynamic Young's modulus of 0.1 to 5 GPa and a damping loss factor of 5-30% ($\eta$=0.05-0.3), and the ratio of the adhesive to the applied surface area of the substrates being 80-250 g/m2. The laminated panel is relatively soft in construction and hence sound waves caused by knocking or impact noise is surprisingly damped using considerably less adhesive than known panels. The use of soft substrates and less adhesive significantly reduces the weight of the panel. Furthermore, the use of less adhesive significantly reduces costs and makes production easier.

14 Claims, 1 Drawing Sheet

(56) References Cited

U.S. PATENT DOCUMENTS

| | | | |
|---|---|---|---|
| 7,726,441 B2 * | 6/2010 | Uryu et al. | 181/170 |
| 7,799,410 B2 * | 9/2010 | Tinianov | 428/212 |
| 7,883,763 B2 * | 2/2011 | Tinianov | 428/201 |
| 7,908,818 B2 | 3/2011 | Tinianov et al. | |
| 8,061,475 B2 * | 11/2011 | Mori et al. | 181/205 |
| 8,181,738 B2 * | 5/2012 | Tinianov et al. | 181/290 |
| 8,371,635 B2 * | 2/2013 | Mizata | 296/39.3 |
| 2006/0165977 A1 * | 7/2006 | Rehfeld et al. | 428/343 |
| 2008/0056505 A1 * | 3/2008 | Rehfeld et al. | 381/71.4 |
| 2008/0245603 A1 * | 10/2008 | Tinianov | 181/207 |
| 2008/0264721 A1 | 10/2008 | Tinianov et al. | |
| 2010/0133037 A1 * | 6/2010 | Payot et al. | 181/207 |
| 2010/0206663 A1 * | 8/2010 | Payot et al. | 181/208 |
| 2012/0018245 A1 * | 1/2012 | Payot et al. | 181/208 |

FOREIGN PATENT DOCUMENTS

| | | | | |
|---|---|---|---|---|
| GB | 2151547 | | 7/1985 | |
| GB | 2447578 | | 9/2008 | |
| GB | 2447578 | A * | 9/2008 | E04F 13/04 |
| JP | 57004767 | A | 1/1982 | |
| JP | 8029575 | B | 3/1996 | |
| WO | 2008124672 | A | 10/2008 | |

OTHER PUBLICATIONS

QuietRock 510, Datasheet and Material Safety Data Sheet; Serious Energy, Inc., 2012.

QuietRock ES Mold Resistant, Datasheet. Serious Energy, Inc., 2012.

Translation of Detailed Opposition filed by Mahapan Fiber Cement PLC in related TH Application No. 1101001964, filed Mar. 10, 2010, published Jan. 28, 2013 with Publication No. 120387.

Aug. 30, 2013 Unknown Author, Third Party Observations filed in connection with related European Patent Application No. 10710407.

* cited by examiner

LAMINATED ACOUSTIC SOUNDPROOFING PANEL

CLAIM OF PRIORITY

This application is a continuation of and claims priority under 35 U.S.C. §371 to International Application No. PCT/GB2010/050425 filed on Mar. 10, 2010, which claims priority to GB 0904099.9 filed on Mar. 10, 2009. The contents of both aforementioned applications are incorporated herein by reference.

BACKGROUND OF THE INVENTION

1. Field of the Invention

This invention relates to a laminated building panel with improved acoustical soundproofing properties.

2. Description of the Related Art

It is well known to form acoustic building panels for walls, ceilings, floors and the like by laminating together two or more substrate layers. Once such building panel is disclosed in WO2008/124672 and comprises a pair of plasterboard substrate layers, for example of gypsum, which are bonded together with an acrylic glue.

Typically most acoustic building panels attempt to improve the overall sound transmission coefficient by increasing the waited sound reduction index ($R_w$) using substrate layers which themselves have good waited sound reduction index ($R_w$) values. The substrate layers are bonded together with a thick layer of adhesive which improves waited sound reduction index ($R_w$) value. For this reason known acoustic building panels have been heavy in construction, expensive and difficult to manufacture.

We have now devised a laminated acoustic building panel which alleviates the above-mentioned problems.

BRIEF SUMMARY OF THE INVENTION

In accordance with the present invention, there is provided a laminated acoustic building panel comprising a first substrate layer, a second substrate layer bonded to the first layer by an adhesive layer, the panel having a dynamic Young's modulus of 0.1 to 5 GPa and a damping loss factor of 5-30% ($\eta=0.05$-$0.3$), wherein the ratio of the adhesive to the applied surface area of the substrate is 80-250 g/m².

A laminated panel having the above-mentioned characteristics is relatively soft in construction and hence sound waves caused by knocking or impact noise is surprisingly damped using considerably less adhesive than known panels. The use of soft substrates and less adhesive significantly reduces the weight of the panel. Furthermore, the use of less glue significantly reduces costs and makes production easier.

Preferably the substrate layers comprise sheets of gypsum (i.e. plasterboard), gypsum fibre or cement.

Preferably the substrate sheets are formed of identical material and are preferably identical in thickness, although sheets of different thicknesses and/or materials can be used. At least one substrate sheet may comprise layers which are laminated together. One such substrate sheet is disclosed in European Patent Application EP1688553 and provides enhanced acoustic insulation properties compared with conventional gypsum plasterboards.

Preferably each substrate layer has a thickness of 6 to 25 mm.

Preferably the adhesive has a dynamic Young's modulus (at 20° C.) of 0.1 to 50 MPa at 100 Hz and/or 0.5 MPa to 100 MPa at 1000 Hz and a loss factor of at least 50% ($\eta>0.5$).

Alternatively, the adhesive has a dynamic Young's modulus (at 20° C.) of 0.1 to 0.5 MPa at 100 Hz and/or 0.5 MPa to 100 MPa at 1000 Hz and a loss factor of at least 50% ($\eta>0.5$).

We have found that the greatest damping of sound waves caused by knocking or impact noise is achieved when the substrate layers are bonded together with a very thin layer of adhesive (less than 250 g/m²) having the lowest Young's modulus and the highest loss factor.

Preferably the adhesive comprises an acrylic-based adhesive, such as a tile or paper adhesive, preferably having a loss factor of 100% ($\eta=1.0$).

Alternatively, the adhesive may comprise a hot-melt adhesive.

Preferably the ratio of the adhesive to the applied surface area of the substrate is 100-150 g/m². Alternatively, the ratio of the adhesive to the applied surface area of the substrate is 80-100 g/m²

BRIEF DESCRIPTION OF THE SEVERAL VIEWS OF THE DRAWINGS

An embodiment of the present invention will now be described by way of example only and with reference to the accompanying drawings, in which.

DETAILED DESCRIPTION OF THE INVENTION

Figure 1:
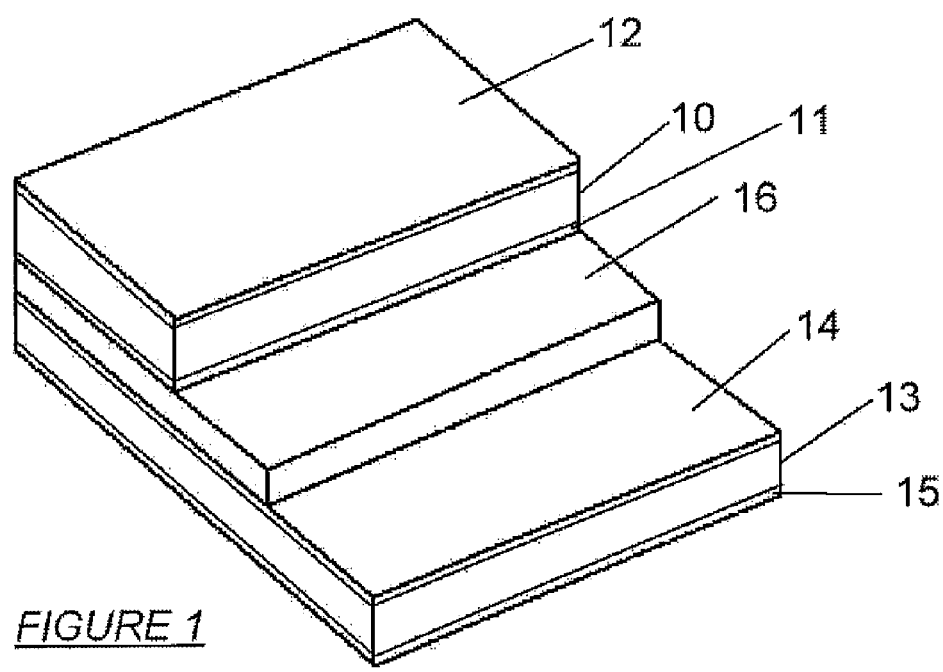
FIG. 1 is a perspective view of a laminated acoustic soundproofing building panel in accordance with the present invention.

Referring to FIG. 1 of the drawings, there is shown a laminated acoustic soundproofing building panel for use as a wall board, floor panel or ceiling panel. The panel comprises a first substrate sheet 10 of plasterboard having a core formed of gypsum plaster (calcium sulphate hemihydrate) which is disposed between inner and outer lining sheets 11, 12 of paper.

The panel also comprises a second substrate sheet 13 of plasterboard having a core formed of gypsum plaster which is disposed between inner and outer lining sheets 14, 15 of paper. The first and second substrate sheets 10,13 are bonded in face-to-face registration by a layer 16 of acrylic adhesive.

The layer 16 is formed by applying a continuous layer of adhesive onto the inner face of the second substrate sheet 14 in quantity of 80-250 g/m², preferably 100-150 g/m². The first substrate sheet 10 is then applied onto the adhesive layer 16, whereupon the substrate sheets 10,13 are pressed together until the adhesive has cured sufficiently.

The loss factor and Young's modulus values of the panel components herein are measured and calculated by the mechanical impedance method (MIM), which is based on ISO 16940 standard, wherein continuous subtle vibration is applied to the centre of a test piece.

The value of dynamic Young modulus for substrate sheets 10,13 having a thickness of 6-25 mm is 1-8 GPa at 500 Hz and generally around 3 GPa+/−1 GPa. The loss factor evaluated on each peak is less than 5% ($\eta=0.05$).

It is well known to the skilled in the art that the dynamic Young modulus of polymer is dependant on frequency and the temperature. The data can be measured with a DMTA system (Dynamical Mechanical Thermo Analysis), for example Metravib Viscoanalyser. Accordingly, the typical values for the Young's modulus of the adhesive layer 16 at 20° C. are as follows at the given frequencies:

100 Hz 0.1 MPa<E<50 MPa
1000 Hz 0.5 MPa<E<100 MPa

The minimum loss factor of the adhesive layer 16 is a minimum of 50% ($\eta$>0.5).

Accordingly, the combined Young modulus value for the whole panel is 0.1-5 GPa and the equivalent loss factor evaluated on each peak is generally between 5% and 30% (0.05<$\eta$<0.3) and preferably is approximately 20% ($\eta$=0.2), depending on the characteristics of the adhesive used for the layer 16.

The most surprising results, with a really thin layer of damping material (less than 250 g/m$^2$), are obtained with the softest Young modulus and the highest loss factor.

Figure 2:
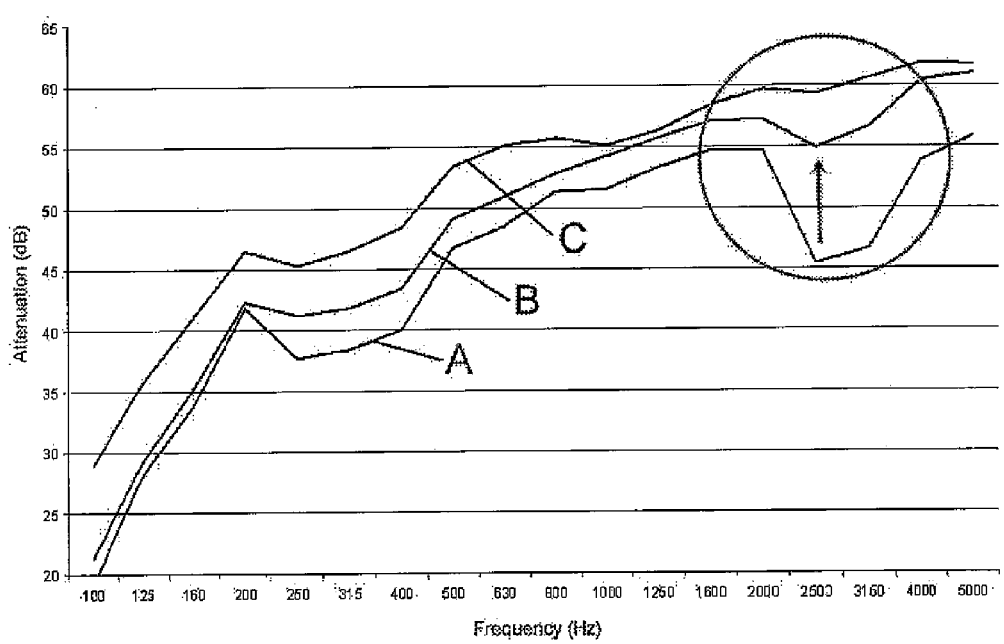
FIG. 2 is a graph of sound attenuation vs. frequency of test results obtained from a) known plaster board, b) a first embodiment of laminated acoustic soundproofing building panel in accordance with the present invention, and c) a second embodiment of laminated acoustic soundproofing building panel in accordance with the present invention.

Referring to FIG. 2 of the drawings, there is shown a graph of sound attenuation vs. frequency of test results obtained from the following partitions:

A) conventional plasterboard mounted on studs separated by 48 mm;
B) a laminated acoustic soundproofing building panel in accordance with the present invention mounted on studs separated by 48 mm and having substrate sheets 10,13 of conventional plasterboard; and
C) a laminated acoustic soundproofing building panel in accordance with the present invention mounted on studs separated by 48 mm and having substrate sheets 10,13 of acoustic wallboard of the kind disclosed in European Patent Application EP1688553.

Firstly, it can be seen that the sound attenuation properties of a partition formed with conventional plasterboard increases from 100 Hz, until there is a significant drop in attenuation (sound transmission loss) by approximately 10 dB towards the critical frequency between approximately 1600 and 4000 Hz. The critical frequency is the frequency at which the wavelength of sound in air equals the flexural bending wavelength in the partition.

Secondly, it can be seen that the sound attenuation properties of a partition formed with a laminated acoustic soundproofing building panel in accordance with the present invention having substrate sheets 10,13 of conventional plasterboard are improved over the whole frequency range. Moreover, it can be seen that there is less of a drop in attenuation towards the critical frequency between approximately 1600 and 4000 Hz.

Thirdly, it can be seen that the sound attenuation properties of a partition formed with a laminated acoustic soundproofing building panel in accordance with the present invention having substrate sheets 10,13 of acoustic wallboard are yet further improved over the whole frequency range and there is even less of a drop in attenuation towards the critical frequency between approximately 1600 and 4000 Hz.

The benefit of a laminated acoustic soundproofing building panel in accordance with the present invention is due to the properties of the glue (ie its Dynamic Young's Modulus and loss factor) and the selection of the substrate sheets 10,13, leading to enhanced acoustic performance. The enhanced acoustic performance is partially due to an increased weighted sound reduction index ($R_w$) and the increased damping of sound waves caused by knocking or impact noise.

This is surprisingly achieved using considerably less adhesive than known laminated acoustic soundproofing building panels.

In an alternative embodiment, the substrate sheets 10,13 comprise cement wallboards and have values of dynamic Young's modulus between 5 and 15 GPa at 500 Hz.

In another alternative embodiment, the substrate sheets 10,13 comprise wood wallboards and have values of dynamic Young's modulus between 1 and 15 GPa at 500 Hz.

The invention claimed is:

1. A laminated acoustic building panel comprising a first substrate layer, a second substrate layer bonded to the first layer by an adhesive layer, the panel having a dynamic Young's modulus of 0.1 to 5 GPa and a damping loss factor of 5-30% ($\eta$=0.05-0.3), wherein the ratio of the adhesive to the applied surface area of the substrate is 80-250 g/m$^2$ and wherein the adhesive has a dynamic Young's modulus (at 20° C.) of 0.1 to 50 MPa at 100 Hz and/or 0.5 MPa to 100 MPa at 1000 Hz and a loss factor of at least 50% ($\eta$>0.5).

2. A laminated acoustic building panel as described in claim 1, in which at least one the substrate layers comprises a sheet of gypsum or plasterboard.

3. A laminated acoustic building panel as claimed in claim 1 or claim 2, in which the adhesive has a dynamic Young's modulus (at 20° C.) of 0.1 to 0.5 MPa at 100 Hz and/or 0.5 MPa to 100 MPa at 1000 Hz and a loss factor of at least 50% ($\eta$>0.5).

4. A laminated acoustic building panel as described in claim 1 in which the adhesive comprises an acrylic-based adhesive.

5. A laminated acoustic building panel as described in claim 1 in which the adhesive comprises a hot-melt adhesive.

6. A laminated acoustic building panel as described in claim 1 in which at least one the substrate layers comprises a sheet of fiber reinforced gypsum or fiber reinforced plasterboard.

7. A laminated acoustic building panel as described in claim 1 in which at least one the substrate layers comprises a sheet of cement wallboard.

8. A laminated acoustic building panel as described in claim 1 in which at least one the substrate layers comprises a sheet of wood wallboard.

9. A laminated acoustic building panel as described in claim 1 in which at least one the substrate layers comprises a sheet having layers of material which are laminated together.

10. A laminated acoustic building panel as described in claim 1 in which the substrate sheets are formed of identical material.

11. A laminated acoustic building panel as described in claim 1 in which the substrate sheets are of identical thickness.

12. A laminated acoustic building panel as described in claim 1 in which each substrate layer has a thickness of 6 to 25 mm.

13. A laminated acoustic building panel as described in claim 1 in which the ratio of the adhesive to the applied surface area of the substrate is 100-150 g/m$^2$.

14. A laminated acoustic building panel as described in claim 1 in which the ratio of the adhesive to the applied surface area of the substrate is 80-100 g/m$^2$.

* * * * *